US009657396B2

(12) United States Patent
Behl et al.

(10) Patent No.: US 9,657,396 B2
(45) Date of Patent: May 23, 2017

(54) PRODUCTION OF A DECORATIVE LAYER ON CERAMIC SURFACES (71) Applicant: Heraeus Deutschland GmbH & Co. KG, Hanau (DE)

(72) Inventors: Susanne Behl, Mömbris-Königshofen (DE); Peter Kraemer, Altenstadt (DE); Kai-Ulrich Boldt, Hanau (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 7 days.

(21) Appl. No.: 14/813,761

(22) Filed: Jul. 30, 2015

(65) Prior Publication Data

US 2016/0032459 A1  Feb. 4, 2016

(30) Foreign Application Priority Data

Aug. 1, 2014 (EP) .................................... 14179443

(51) Int. Cl.
*C23C 18/08* (2006.01)
*C23C 30/00* (2006.01)
*C03C 17/10* (2006.01)
*C04B 41/51* (2006.01)
*C04B 41/88* (2006.01)
*C04B 41/00* (2006.01)
*C09D 11/322* (2014.01)
*C09D 11/38* (2014.01)

(52) U.S. Cl.
CPC .............. *C23C 30/00* (2013.01); *C03C 17/10* (2013.01); *C04B 41/009* (2013.01); *C04B 41/5116* (2013.01); *C04B 41/88* (2013.01); *C09D 11/322* (2013.01); *C09D 11/38* (2013.01); *C03C 2217/255* (2013.01); *C03C 2217/72* (2013.01); *C03C 2218/119* (2013.01)

(58) Field of Classification Search
CPC ......... C23C 18/08; C23C 30/00; C03C 17/10; C03C 2217/255; C03C 2217/72; C04B 41/009; C04B 41/5116; C04B 41/4535; C04B 41/4554; C04B 41/5105; C04B 41/5122; C04B 41/88

USPC ....................................... 106/1.23; 427/372.2
See application file for complete search history.

(56) References Cited

U.S. PATENT DOCUMENTS

| | | | |
|---|---|---|---|
| 3,266,912 A | 8/1966 | Murphy | |
| 3,391,010 A | 7/1968 | Hauel | |
| 5,328,769 A * | 7/1994 | Lotze | C04B 41/5116 427/126.1 |
| 5,401,535 A * | 3/1995 | Bishop | C04B 41/009 427/229 |
| 5,545,452 A * | 8/1996 | Schulz | C03C 17/10 156/237 |
| 6,607,816 B1 * | 8/2003 | Vignali | C04B 41/009 427/147 |
| 6,733,651 B1 | 5/2004 | Hoffacker et al. | |
| 2015/0240097 A1 * | 8/2015 | Ruiz Vega | C04B 41/5116 106/31.13 |

FOREIGN PATENT DOCUMENTS

| | | |
|---|---|---|
| DE | 1421865 A1 | 1/1969 |
| DE | 4122131 C1 | 7/1992 |
| EP | 2128113 A1 | 12/2009 |
| WO | 00/10941 A1 | 3/2000 |
| WO | 00/73540 A1 | 12/2000 |
| WO | 2014/037597 A1 | 3/2014 |

OTHER PUBLICATIONS

English translation of EP 2128113; May 2009; 10 pages.*
European Search Report issued Jan. 23, 2015 in EP Application No. 14179443.8.

* cited by examiner

*Primary Examiner* — Helene Klemanski
(74) *Attorney, Agent, or Firm* — Panitch Schwarze Belisario & Nadel LLP (57) ABSTRACT The invention relates to a mixture containing a gold thiolate, a rhodium(III) compound, and a solvent that contains at least one OH group, in which the mixture has a ratio $V=(a)/(b) \geq 2.2$; (a) is the fraction of solvent and (b) is the gold fraction of the gold thiolate, each relative to the total weight of the mixture.

24 Claims, 3 Drawing Sheets

PRODUCTION OF A DECORATIVE LAYER ON CERAMIC SURFACES

BACKGROUND OF THE INVENTION

Mixtures containing a gold thiolate are known from the prior art. They may be used to decorate substrates by applying them to the substrate surface and subsequent graining (see, for example, U.S. Pat. No. 3,391,010, DE 1421865 A and DE 4122131 C1). There is an increasing desire to apply decorative preparations using a nozzle, such as by inkjet printing. In this context, it has been found that the application of the mixtures known from the prior art using a nozzle, in particular in the course of inkjet printing, is associated with the gold thiolates in the mixture being reduced on the metal parts of the applicator, such as the inkjet printer, contacting the mixtures. As a result, the metal parts of the applicator become coated with gold. Due to this lack of corrosion resistance, the applicator becomes contaminated and ultimately is no longer usable. Moreover, the amount of gold deposited on the metal parts of the applicator is no longer available for decoration of the substrates, which has a disadvantageous effect on the decoration thus produced. Moreover, it has been found that graining these mixtures often leads to a matte purple-colored layer rather than the desired glossy layer. Moreover, at least partial segregation during storage is a problem encountered with many mixtures known from the prior art. Unstable mixtures of this type are not suitable for application through a nozzle, in particular using an inkjet printer.

Alternative methods for decoration of substrates are also known from the prior art. For example, WO 00/73540 A1 describes a process in which an aqueous gold solution is used to deposit gold in a galvanic gold bath. Moreover, an aqueous solution of a gold thiolate compound is applied onto a ceramic in WO 00/10941 A1 in order to obtain a colored decoration by heating.

However, the prior art does not describe any way in which a gold compound may be applied onto a substrate by targeted and variable application using a nozzle, such as, for example, by inkjet printing.

BRIEF SUMMARY OF THE INVENTION

In general, it is an object of the invention to overcome, at least in part, the disadvantages in the prior art.

One object consists of providing a gold-containing mixture for decoration of substrates that may be applied using a nozzle, such as an inkjet printer.

Another object consists of providing a gold-containing mixture for decoration of substrates that may be applied by using a nozzle, such as an inkjet printer without gold being deposited on parts of the applicator, such as on the inkjet printer.

Another object consists of providing a gold-containing mixture for decoration of substrates that may be applied using a nozzle, such as an inkjet printer, without gold being deposited on parts of the applicator and without any segregation occurring during storage.

Another object consists of providing a gold-containing mixture for decoration of substrates that provides for a clean burn-off of the organic fractions of the mixture.

Another object consists of providing a gold-containing mixture for decoration substrates that generates a gold-based, in particular a gold, yellow or white gold, gloss on the substrate.

A further object consists of providing a method that allows for accurate dosing of a gold compound on a substrate.

Another object consists of providing an efficient and inexpensive method for the production of a layered structure.

A further object consists of providing an environmentally compatible method for producing a layered structure having a gold-based layer, in particular a gold layer, a yellow layer, or a white gold layer.

Moreover, an object consists of being able to provide a layered structure with a gold-based layer, in particular a gold layer, a yellow layer, or a white gold level, whose thickness may be varied over a large range.

Furthermore, an object consists of providing a method for the production of a layered structure with a well-adhering, gold-based coating, in particular a gold coating, a yellow coating, or a white gold coating.

It is a further object to be able to produce a layered structure that has a surface that is as glossy as possible.

This invention thus relates to a mixture containing (i) a gold thiolate, (ii) a rhodium(III) compound, and (iii) a solvent containing at least one OH group, in which the mixture has a ratio $V=(a)/(b)\geq 2.2$; (a) is the fraction of solvent (iii) and (b) is the gold fraction of the gold thiolate (i), each relative to the total weight of the mixture.

The invention further relates to a method for producing a layered structure comprising the steps of: (a) providing a mixture containing (i) a gold thiolate, (ii) a rhodium(III) compound, and (iii) a solvent containing at least one OH group, in which the mixture has a ratio $V=(a)/(b)\geq 2.2$, where (a) is the fraction of solvent (iii) and (b) is the gold fraction of the gold thiolate (i), each relative to the total weight of the mixture, (b) applying the mixture through a nozzle onto a substrate to obtain a precursor, and (c) heating the precursor to a temperature above 200° C. to form the layered structure.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

A first embodiment of the present invention is a mixture comprising:
(i) a gold thiolate,
(ii) a rhodium(III) compound, and
(iii) a solvent containing at least one OH group, in which the mixture has a ratio $V=(a)/(b)\geq 2.2$; (a) is the fraction of solvent (iii) and (b) is the gold fraction of the gold thiolate (i), each relative to the total weight of the mixture.

The mixture contains a gold thiolate (i). A gold thiolate may be understood to be any gold compound that contains gold and a thiolate residue. In this context, a thiolate residue is a residue that contains an organic residue bound to sulphur. Gold may be present in the gold thiolate in any possible oxidation stage, but preferably the gold thiolate is a gold(I) thiolate. The gold thiolate is preferably selected from the group consisting of aliphatic gold thiolates, heteroaliphatic gold thiolates, and aromatic gold thiolates.

Aliphatic gold thiolates may be understood to be all gold thiolates that comprise gold and a thio-aliphatic residue. The thio-aliphatic residue comprises, aside from a thio group, at least one aliphatic group. Preferably, the thio-aliphatic residue does not contain an aromatic group. The aliphatic gold thiolates may be cyclic or acyclic. According to a preferred embodiment, the aliphatic gold thiolate is a gold alkylthiolate such as a gold cycloalkylthiolate. According to one embodiment, the aliphatic gold thiolates are cyclic terpenethiolates. According to a further preferred embodiment, the aliphatic gold thiolate is selected from primary, secondary, or tertiary aliphatic gold thiolates. A secondary aliphatic gold thiolate may be understood to be an aliphatic gold thiolate that comprises a secondary carbon atom in an α position with respect to the thiol group of the thiolate residue. A tertiary aliphatic gold thiolate may be understood to be an aliphatic gold thiolate that comprises a tertiary carbon atom in an α position with respect to the thiol group of the thiolate residue. The aliphatic gold thiolate is preferably selected from the group consisting of gold(I) tert-butylthiolate, gold(I) tert-amylthiolate, gold(I) tert-octylthiolate, gold(I) tert-nonylthiolate, gold(I) tert-dodecylthiolate, gold(I) tetradecylthiolate, gold(I) tert-hexadecylthiolate, and gold(I) pinanylthiolate.

Heteroaliphatic gold thiolates may be understood to be all gold thiolates which comprise gold and a thio-heteroaliphatic residue. The thio-heteroaliphatic residue contains, aside from a thio group and an aliphatic group, a further functional group that contains at least one hetero-atom. This hetero-atom is preferably an oxygen atom or a nitrogen atom and may be selected, for example, from the group consisting of a carboxyl group, a carboxylic acid ester group, a keto group, an aldehyde group, a hydroxyl group, an amide group, and an amino group. Preferably, the thio-heteroaliphatic residue does not contain an aromatic group. The heteroaliphatic gold thiolates may be cyclic or acyclic. According to a preferred embodiment, the heteroaliphatic gold thiolates are gold heteroalkylthiolates such as gold cyclo-heteroalkylthiolates. According to a further preferred embodiment, the heteroaliphatic gold thiolates are selected from primary, secondary, or tertiary heteroaliphatic gold thiolates. A secondary heteroaliphatic gold thiolate may be understood to be a heteroaliphatic gold thiolate that contains a secondary carbon atom in an α position with respect to the thiol group of the thiolate residue. A tertiary aliphatic gold thiolate may be understood to be a heteroaliphatic gold thiolate that contains a tertiary carbon atom in an α position with respect to the thiol group of the thiolate residue. According to a preferred embodiment, the heteroaliphatic gold thiolate is selected from the group consisting of gold(I) glutathione and gold(I) cysteine.

Aromatic gold thiolates may be understood to be all gold thiolates that contain gold and a thio-aromatic residue. The thio-aromatic residue comprises, aside from a thio group, at least one aromatic group. The thio-aromatic residue may contain at least one further group aside from the thio group and the aromatic group. This further group may be, for example, an aliphatic or heteroaliphatic group. According to a preferred embodiment, the aromatic gold thiolates are selected from gold arylthiolates and gold aralkylthiolates.

The gold thiolate preferably comprises at least 5 carbon atoms, more preferably at least 6 carbon atoms, even more preferably at least 8 carbon atoms, particularly preferably at least 10 carbon atoms, and in particular at least 12 carbon atoms. Preferably, the gold thiolate comprises no more than 50 carbon atoms, more preferably no more than 20 carbon atoms, and even more preferably no more than 15 carbon atoms. The gold thiolate preferably comprises 6-50 carbon atoms, more preferably 8-20 carbon atoms, even more preferably 10-15 carbon atoms, and particularly preferably 12-15 carbon atoms.

According to a preferred embodiment, the gold thiolate comprises, in an α position with respect to the thiol group of the thiolate residue, a tertiary carbon atom that is connected to three aliphatic or heteroaliphatic residues. According to a particularly preferred embodiment, the gold thiolate comprises, in an α position with respect to the thiol group of the thiolate residue, a tertiary carbon atom that is connected to three aliphatic or heteroaliphatic residues, in which one of the aliphatic or heteroaliphatic residues comprises at least 4 carbon atoms, more preferably at least 6 carbon atoms, and even more preferably at least 8 carbon atoms, and two of the aliphatic or heteroaliphatic residues comprise no more than 5 carbon atoms, more preferably no more than 3 carbon atoms, and even more preferably no more than 1 carbon atom.

According to a further preferred embodiment, the gold thiolate is represented by the formula Au(I)—$R^1$, where $R^1$ represents the —S—$C(CH_3)_2$—$C_9H_{19}$ residue. This compound is also called gold(I) tert-dodecylthiolate or gold(I) tert-dodecylmercaptide.

The mixture further contains a rhodium(III) compound which is also called rhodium compound (ii).

According to a preferred embodiment, the rhodium(III) compound is represented by the formula Rh(III)—$R^2R^3R^4$, where $R^2$, $R^3$, and $R^4$ are each independently aliphatic or heteroaliphatic residues. Preferably, each of the aliphatic or heteroaliphatic residues contains 2-20 carbon atoms and more preferably 2-18 carbon atoms. According to a particularly preferred embodiment, the residues $R^2$, $R^3$, and $R^4$ are identical residues. Preferably, at least one of the residues $R^2$, $R^3$, and $R^4$ is a carboxylate residue. According to a preferred embodiment, the rhodium(III) compound contains at least 4 carbon atoms, more preferably at least 5 carbon atoms, and even more preferably at least 7 carbon atoms. According to a further preferred embodiment, the rhodium(III) compound contains no more than 60 carbon atoms, more preferably no more than 56 carbon atoms, and even more preferably no more than 52 carbon atoms. According to another preferred embodiment, the rhodium(III) compound contains 4-60 carbon atoms, more preferably 5-56 carbon atoms, and even more preferably 7-52 carbon atoms.

According to another preferred embodiment, the rhodium(III) compound is selected from the group consisting of rhodium(III) triacetate and rhodium(III) triisononylcarboxylate.

The mixture also contains a solvent that contains at least one OH group, which is referred to as solvent (iii).

The OH group of the solvent may be part of a functional group such as a carboxylic acid group. However, the OH group is preferably a hydroxyl group that is not part of a functional group.

The solvent is preferably a hydroxyaliphatic solvent, which is an aliphatic solvent that contains at least one OH group.

The solvent may be an acyclic or an acyclic solvent. According to a preferred embodiment, the solvent is an acyclic solvent.

According to a preferred embodiment, the solvent contains at least 4 carbon atoms, more preferably at least 5 carbon atoms, even more preferably at least 6 carbon atoms, and particularly preferably at least 7 carbon atoms. According to another preferred embodiment, the solvent contains no more than 30 carbon atoms, more preferably no more than 25 carbon atoms, even more preferably no more than 20 carbon atoms, and particularly preferably no more than 15 carbon atoms. According to another preferred embodiment, the solvent contains 4-30 carbon atoms, more preferably 5-25 carbon atoms, even more preferably 6-20 carbon atoms, and particularly preferably 7-15 carbon atoms.

Preferably, the solvent is an alcohol. According to a preferred embodiment, the alcohol is a mono-alcohol.

According to another preferred embodiment, the solvent is an non-branched compound.

According to yet another preferred embodiment, the molar mass of the solvent is in the range of 50-200 g×mol$^{-1}$, more preferably in the range of 60-150 g×mol$^{-1}$, and even more preferably in the range of 70-120 g×mol$^{-1}$.

Preferably, the solvent is selected from the group consisting of 1-butanol, 2-butanol, 1-pentanol, 2-pentanol, 3-pentanol, 1-hexanol, 2-hexanol, 3-hexanol, 1-heptanol, 2-heptanol, 3-heptanol, 4-heptanol, 1-octanol, 2-octanol, 3-octanol, and 4-octanol. According to a particularly preferred embodiment, the solvent is 1-heptanol.

According to an alternative preferred embodiment, the mixture contains (iv) a silver thiolate. The use of a silver thiolate in the mixture will impart a yellow hue, rather than a gold hue, on the layer to be produced.

The silver thiolate may be understood to be any silver compound that contains silver and a thiolate residue. In this context, a thiolate residue is a residue that contains an organic residue bound to sulphur. Silver may be present in the silver thiolate in any possible oxidation stage. Preferably, the silver thiolate is a silver(I) thiolate.

The silver thiolate is preferably selected from the group consisting of aliphatic silver thiolates, heteroaliphatic silver thiolates, and aromatic silver thiolates.

Aliphatic silver thiolates may be understood to be all silver thiolates that comprise silver and a thio-aliphatic residue. The thio-aliphatic residue comprises, aside from a thio group, at least one aliphatic group. Preferably, the thio-aliphatic residue does not contain an aromatic group. The aliphatic silver thiolates may be cyclic or acyclic. According to a preferred embodiment, the aliphatic silver thiolate is a silver alkylthiolates such as a silver cycloalkylthiolate. According to one embodiment, the aliphatic silver thiolates are cyclic terpenethiolates. According to a further preferred embodiment, the aliphatic silver thiolate is selected from primary, secondary, or tertiary aliphatic silver thiolates. A secondary aliphatic silver thiolate may be understood to be an aliphatic silver thiolate that contains a secondary carbon atom in an α position with respect to the thiol group of the thiolate residue. A tertiary aliphatic silver thiolate may be understood to be an aliphatic silver thiolate that contains a tertiary carbon atom in an α position with respect to the thiol group of the thiolate residue. The aliphatic silver thiolate is preferably selected from the group consisting of silver(I) tert-butylthiolate, silver(I) tert-amylthiolate, silver(I) tert-octylthiolate, silver(I) tert-nonylthiolate, silver(I) tert-dodecylthiolate, silver(I) tetradecylthiolate, silver(I) tert-hexadecylthiolate, and silver(I) pinanylthiolate.

Heteroaliphatic silver thiolates may be understood to be all silver thiolates that comprise silver and a thio-heteroaliphatic residue. The thio-heteroaliphatic residue comprises, aside from a thio group and an aliphatic group, a further functional group that contains at least one hetero-atom. This hetero-atom preferably is an oxygen atom or a nitrogen atom. The functional group may be selected, for example, from the group consisting of a carboxyl group, a carboxylic acid ester group, a keto group, a hydroxyl group, an aldehyde group, an amide group, and an amino group. Preferably, the thio-heteroaliphatic residue does not contain an aromatic group. The heteroaliphatic silver thiolates may be cyclic or acyclic. According to a preferred embodiment, the heteroaliphatic silver thiolates are selected silver heteroalkylthiolates such as silver cyclo-heteroalkylthiolates. According to a further preferred embodiment, the heteroaliphatic silver thiolates are selected from primary, secondary, or tertiary heteroaliphatic silver thiolates. A secondary heteroaliphatic silver thiolate may be understood to be a heteroaliphatic silver thiolate that contains a secondary carbon atom in an α position with respect to the thiol group of the thiolate residue. A tertiary aliphatic silver thiolate may be understood to be a heteroaliphatic silver thiolate that contains a tertiary carbon atom in an α position with respect to the thiol group of the thiolate residue. According to a preferred embodiment, the heteroaliphatic silver thiolate is selected from silver(I) glutathione and silver(I) cysteine.

Aromatic silver thiolates may be understood to be all silver thiolates that comprise silver and a thio-aromatic residue. The thio-aromatic residue contains, aside from a thio group, at least one aromatic group. The thio-aromatic residue may contain at least one further group aside from the thio group and the aromatic group. This further group may be, for example, an aliphatic or heteroaliphatic group. According to a preferred embodiment, the aromatic silver thiolates are selected from the group consisting of silver arylthiolates and silver aralkylthiolates.

The silver thiolate preferably contains at least 5 carbon atoms, more preferably at least 6 carbon atoms, even more preferably at least 8 carbon atoms, particularly preferably at least 10 carbon atoms, and in particular at least 12 carbon atoms. Preferably, the silver thiolate contains no more than 50 carbon atoms, more preferably no more than 20 carbon atoms, and even more preferably no more than 15 carbon atoms. The silver thiolate preferably contains 6-50 carbon atoms, more preferably 8-20 carbon atoms, even more preferably 10-15 carbon atoms, and particularly preferably 12-15 carbon atoms.

According to a preferred embodiment, the silver thiolate contains, in a α position with respect to the thiol group of the thiolate residue, a tertiary carbon atom that is connected to three aliphatic or heteroaliphatic residues. According to a particularly preferred embodiment, the silver thiolate contains, in an α position with respect to the thiol group of the thiolate residue, a tertiary carbon atom that is connected to three aliphatic or heteroaliphatic residues, in which one of the aliphatic or heteroaliphatic residues contains at least 4 carbon atoms, more preferably at least 6 carbon atoms, and even more preferably at least 8 carbon atoms, and two of the aliphatic or heteroaliphatic residues contains no more than 5 carbon atoms, more preferably no more than 3 carbon atoms, and even more preferably no more than 1 carbon atom.

According to a further preferred embodiment, the silver thiolate is represented by the formula Ag(I)—R$^5$, where R$^5$ represents the —S—C(CH$_3$)$_2$—C$_9$H$_{19}$ residue. This compound is also called silver(I) tert-dodecylthiolate or silver(I) tert-dodecylmercaptide.

According to a further alternative embodiment, the mixture contains (v) a palladium or platinum compound selected from the group consisting of palladium thiolates, palladium carboxylates, platinum thiolates, and platinum carboxylates. The use of a palladium or platinum compound (v) in the mixture will impart a white gold hue, rather than a gold hue, on the layer to be produced.

A palladium or platinum thiolate may be understood to be any palladium and/or platinum compound that contains palladium and/or platinum and a thiolate residue. In this context, a thiolate residue is a residue that contains an organic residue bound to sulphur. Palladium and/or platinum may be present in the palladium thiolate and/or platinum thiolate in any possible oxidation stage. Preferably, the palladium thiolate and/or platinum thiolate is a palladium(I) thiolate or a palladium(II) thiolate and/or a platinum(I) thiolate or a platinum(II) thiolate.

The palladium thiolate is preferably selected from the group consisting of aliphatic palladium thiolates, heteroaliphatic palladium thiolates, and aromatic palladium thiolates. The platinum thiolate is preferably selected from the group consisting of aliphatic platinum thiolates, heteroaliphatic platinum thiolates, and aromatic platinum thiolates.

Aliphatic palladium thiolates and/or platinum thiolates may be understood to be all palladium thiolates and/or platinum thiolates that contain palladium and/or platinum and a thio-aliphatic residue. The thio-aliphatic residue contains, aside from a thio group, at least one aliphatic group. Preferably, the thio-aliphatic residue does not contain an aromatic group. The aliphatic palladium thiolates and/or platinum thiolates may be cyclic or acyclic. According to a preferred embodiment, the aliphatic palladium thiolate is selected from the group consisting of palladium alkylthiolates. According to a further preferred embodiment, the aliphatic platinum thiolate is selected from the group consisting of platinum alkylthiolates. The palladium alkythiolates may be, for example, palladium cyclo-alkylthiolates. The platinum alkythiolates may be, for example, platinum cyclo-alkylthiolates. According to one embodiment, the aliphatic palladium thiolates and/or platinum thiolates are cyclic terpenethiolates. According to a further preferred embodiment, the aliphatic palladium thiolate is selected from primary, secondary, or tertiary aliphatic palladium thiolates. According to a further preferred embodiment, the aliphatic platinum thiolate is selected from primary, secondary, or tertiary aliphatic platinum thiolates. A secondary aliphatic palladium thiolate and/or platinum thiolate may be understood to be an aliphatic palladium thiolate and/or platinum thiolate that contains a secondary carbon atom in an α position with respect to the thiol group of the thiolate residue. A tertiary aliphatic palladium thiolate and/or platinum thiolate may be understood to be an aliphatic palladium thiolate and/or platinum thiolate that contains a tertiary carbon atom in an α position with respect to the thiol group of the thiolate residue. The aliphatic palladium thiolate is preferably selected from the group consisting of palladium (II) di-tert-butylthiolate, palladium(II) di-tert-amylthiolate, palladium(II) di-tert-octylthiolate, palladium(II) di-tert-nonylthiolate, palladium(II) di-tert-dodecylthiolate, palladium (II) bis-tetradecylthiolate, palladium(II) di-tert-hexadecylthiolate, and palladium(II) di-pinanylthiolate. The aliphatic platinum thiolate is preferably selected from the group consisting of platinum(II) di-tert-butylthiolate, platinum(II) di-tert-amylthiolate, platinum(II) di-tert-octylthiolate, platinum(II) di-tert-nonylthiolate, platinum(II) di-tert-dodecylthiolate, platinum(II) bis-tetradecylthiolate, platinum(II) di-tert-hexadecylthiolate, and platinum(II) di-pinanylthiolate.

Heteroaliphatic palladium thiolates and/or platinum thiolates may be understood to be all palladium thiolates and/or platinum thiolates that contain palladium and/or platinum and a thio-heteroaliphatic residue. The thio-heteroaliphatic residue contains, aside from a thio group and an aliphatic group, a further functional group that contains at least one hetero-atom. This hetero-atom is preferably an oxygen atom or a nitrogen atom. The functional group may be selected, for example, from the group consisting of a carboxyl group, a carboxylic acid ester group, a keto group, a hydroxyl group, an aldehyde group, an amide group, and an amino group. Preferably, the thio-heteroaliphatic residue does not contain an aromatic group. The heteroaliphatic palladium thiolates and/or platinum thiolates may be cyclic or acyclic. According to a preferred embodiment, the heteroaliphatic palladium thiolates are selected from the group consisting of palladium heteroalkylthiolates. According to a preferred embodiment, the heteroaliphatic platinum thiolates are selected from the group consisting of platinum heteroalkylthiolates. The palladium heteroalkythiolates and/or platinum heteroalkylthiolates may be, for example, palladium cyclo-heteroalkylthiolates and/or platinum cyclo-heteroalkylthiolates. According to a further preferred embodiment, the heteroaliphatic palladium thiolates are selected from primary, secondary, or tertiary heteroaliphatic palladium thiolates. According to a further preferred embodiment, the heteroaliphatic platinum thiolates are selected from primary, secondary, or tertiary heteroaliphatic platinum thiolates. A secondary heteroaliphatic palladium thiolate and/or platinum thiolate may be understood to be a heteroaliphatic palladium thiolate and/or platinum thiolate that contains a secondary carbon atom in an α position with respect to the thiol group of the thiolate residue. A tertiary aliphatic palladium thiolate and/or platinum thiolate may be understood to be an heteroaliphatic palladium thiolate and/or platinum thiolate that contains a tertiary carbon atom in an α position with respect to the thiol group of the thiolate residue. According to a preferred embodiment, the heteroaliphatic palladium thiolate is selected from palladium(II) diglutathione and palladium(II) cysteine. According to a preferred embodiment, the heteroaliphatic platinum thiolate is selected from platinum(II) di-glutathione and platinum(II) dicysteine.

Aromatic palladium thiolates and/or platinum thiolates may be understood to be all palladium thiolates and/or platinum thiolates that contain palladium and/or platinum and a thio-aromatic residue. The thio-aromatic residue contains, aside from a thio group, at least one aromatic group. The thio-aromatic residue may contain at least one further group aside from the thio group and the aromatic group. This at least one further group may be, for example, an aliphatic or a heteroaliphatic group. According to a preferred embodiment, the aromatic palladium thiolates are selected from the group consisting of palladium arylthiolates and palladium aralkylthiolates. According to a further preferred embodiment, the aromatic platinum thiolates are selected from the group consisting of platinum arylthiolates and platinum aralkylthiolates.

The palladium thiolate and/or platinum thiolate preferably contains at least 5 carbon atoms, more preferably at least 6 carbon atoms, even more preferably at least 8 carbon atoms, particularly preferably at least 10 carbon atoms, and in particular at least 12 carbon atoms. Preferably, the palladium thiolate and/or platinum thiolate contains no more than 50 carbon atoms, more preferably no more than 20 carbon atoms, and even more preferably no more than 15 carbon atoms.

According to a preferred embodiment, the palladium thiolate and/or platinum thiolate contains, in an α position with respect to the thiol group of the thiolate residue, a tertiary carbon atom that is connected to three aliphatic or heteroaliphatic residues. According to a particularly preferred embodiment, the palladium thiolate and/or platinum thiolate contains, in an α position with respect to the thiol group of the thiolate residue, a tertiary carbon atom that is connected to three aliphatic or heteroaliphatic residues, in which one of the aliphatic or heteroaliphatic residues contains at least 4 carbon atoms, more preferably at least 6 carbon atoms, and even more preferably at least 8 carbon atoms, and two of the aliphatic or heteroaliphatic residues contain no more than 5 carbon atoms, more preferably no more than 3 carbon atoms, and even more preferably no more than 1 carbon atom.

According to a further preferred embodiment, the palladium thiolate is represented by the formula Pd(II)-$R^6R^7$, where $R^6$ and $R^7$ each are the —S—$C(CH_3)_2$—$C_9H_{19}$ residue. This compound is also referred to as palladium(II) di-tert-dodecylthiolate or palladium(II) tert-dodecylmercaptide. According to a further preferred embodiment, the platinum thiolate is represented by the formula Pt(II)-$R^8R^9$, where $R^8$ and $R^9$ each are the —S—$C(CH_3)_2$—$C_9H_{19}$ residue. This compound is also referred to as platinum(II) di-tert-dodecylthiolate or platinum(II) tert-dodecylmercaptide.

The palladium carboxylate preferably is a compound that contains at least one carboxylate residue aside from palladium. The palladium carboxylate is preferably a palladium (II) di(carboxylate). This carboxylate residue preferably contains 2-50 carbon atoms, even more preferably 4-50 carbon atoms, and particularly preferably 4-20 carbon atoms. According to a preferred embodiment, the palladium carboxylate is palladium(II) isooctyl-mercaptopropionate, palladium(II) di-acetate or palladium(II) di-ethylhexanoate.

The platinum carboxylate preferably is a compound that contains at least one carboxylate residue aside from platinum. The platinum carboxylate is preferably a platinum(II) di(carboxylate). This carboxylate residue preferably contains 2-50 carbon atoms, even more preferably 4-50 carbon atoms, and particularly preferably 4-20 carbon atoms. According to a preferred embodiment, the platinum carboxylate is platinum (II) di-dodecanoate, platinum(II) di-acetate or platinum(II) diethylhexanoate.

The mixture may also contain further ingredients that are common in this field.

Preferably, the mixture contains a bonding enhancer. Suitable bonding enhancers are known to a person skilled in the art. The bonding enhancer is preferably selected from the group consisting of metal salts and siloxanes. The metal salt is preferably selected from the group consisting of metal carboxylates. The metal cation of the metal salt may be selected, for example, from the group consisting of bismuth cations, silicon cations, and tin cations. The bismuth cation may, for example, be a $Bi^{3+}$ ion. According to a preferred embodiment, the bonding enhancer is therefore selected from the group consisting of siloxanes, bismuth carboxylates, silicon carboxylates, and tin carboxylates. Bismuth 2-ethylhexanoate, for example, is a common bonding enhancer.

The mixture preferably contains a wetting additive. Suitable wetting additives are known to a person skilled in the art. According to a preferred embodiment, the wetting additive is selected from the group consisting of siloxanes, silicones, and surfactants. The wetting additive may, for example, be a polyether-modified polymethylsiloxane.

According to another preferred embodiment, the maximal fraction of halide compounds is 0.05% by weight, more preferably 0.3% by weight, and even more preferably 0.1% by weight, relative to the total weight of the mixture.

According to another preferred embodiment, the maximal fraction of fatty acids is 5.0% by weight, more preferably 4.0% by weight, and even more preferably 3.0% by weight, relative to the total weight of the mixture.

The mixture has a ratio V=(a)/(b)≥2.2, in which (a) is the fraction of solvent (iii) and (b) is the gold fraction of the gold thiolate (i), each relative to the total weight of the mixture. It has been found, surprisingly, that the application of a mixture having a ratio of V=(a)/(b)≥2.2 is not associated with the precipitation of elemental gold on the metal parts of the inkjet printer used for application of the mixture, but that the gold thiolate instead remains in solution in the mixture and the gold contained therein precipitates on the substrate to be coated only during the subsequent firing process.

According to a preferred embodiment, the ratio V=(a)/(b) ≥2.3, more preferably ≥2.4, even more preferably ≥2.5, particularly preferably ≥2.7, more particularly preferably ≥3.0, and in particular ≥3.5. According to another preferred embodiment, the ratio V=(a)/(b)≤30.0, more preferably ≤25.0, even more preferably ≤20.0, particularly preferably ≤18.0, more particularly preferably ≤15.0, and in particular ≤12.0. According to yet another preferred embodiment, the ratio V=(a)/(b) is in the range of 2.2-30.0, more preferably in the range of 2.3-25.0, even more preferably in the range of 2.4-20.0, particularly preferably in the range of 2.5-18.0, more particularly preferably in the range of 2.7-15.0, and in particular in the range of 3.0-12.0.

The calculation of the ratio V=(a)/(b) takes into consideration, in (a), the fraction of solvent (iii) relative to the total weight of the mixture. If more than one type of solvent (iii) is present in the mixture, the calculation is based on the sum of the fractions of all solvents (iii), relative to the total weight of the mixture. The calculation of the ratio V=(a)/(b) takes into consideration, in (b), the gold fraction of the gold thiolate (i), relative to the total weight of the mixture. If more than one type of gold thiolate (i) is present in the mixture, the calculation is based on the sum of the gold fractions of all gold thiolates (i), relative to the total weight of the mixture.

The calculation of the ratio V=(a)/(b) may be illustrated by the following exemplary calculation: A mixture contains 31.25% by weight of a gold(I) thiolate, in which the gold fraction is 48% by weight relative to the weight of the gold(I) thiolate, 30.00% by weight 1-hexanol, 15.00% by weight 1-heptanol, and other ingredients accounting for the remainder. Accordingly, the mixture contains 15.00% by weight (31.25% by weight×48%) gold from the gold thiolate (i) and 45.00% by weight (30.00 parts by weight 1-hexanol+ 15.00 parts by weight 1-heptanol) of solvent (iii). Accordingly, the ratio V=(a)/(b) is 3.00 in this example.

According to a preferred embodiment, the fraction of gold is at least 5.0% by weight, more preferably at least 6.0% by weight, even more preferably at least 7.0% by weight, particularly preferably at least 8.0% by weight, even more particularly preferably at least 9.0% by weight, and in particular at least 10.0% by weight, relative to the total weight of the mixture. It has been found, surprisingly, for a fraction of gold of less than 5.0% by weight, relative to the total weight of the mixture, that a glossy gold layer, yellow layer or white gold layer often forms during heating only if the amount of the mixture applied onto the substrate is very large. According to another preferred embodiment, the fraction of gold is no more than 30.0% by weight, more preferably no more than 27.0% by weight, even more preferably no more than 25.0% by weight, particularly preferably no more than 23.0% by weight, more particularly preferably no more than 21.0% by weight, and in particular no more than 20.0% by weight, relative to the total weight of the mixture. According to yet another preferred embodiment, the fraction of gold is 5.0-30.0% by weight, more preferably 6.0-27.0% by weight, even more preferably 7.0-25.0% by weight, particularly preferably 8.0-23.0% by weight, more particularly preferably 9.0-21.0% by weight, and in particular 10.0-20.0% by weight, relative to the total weight of the mixture.

According to a preferred embodiment, the fraction of gold thiolate (i) is at least 10.0% by weight, more preferably at least 12.0% by weight, even more preferably at least 14.0% by weight, particularly preferably at least 16.0% by weight, more particularly preferably at least 18.0% by weight, and in particular at least 20.0% by weight, relative to the total weight of the mixture. According to another preferred embodiment, the fraction of gold thiolate (i) is no more than 60.0% by weight, more preferably no more than 54.0% by weight, even more preferably no more than 50.0% by weight, particularly preferably no more than 46.0% by weight, more particularly preferably no more than 42.0% by weight, and in particular no more than 40.0% by weight, relative to the total weight of the mixture. According to yet another preferred embodiment, the fraction of gold thiolate (i) is 10.0-60.0% by weight, more preferably 12.0-54.0% by weight, even more preferably 14.0-50.0% by weight, particularly preferably 16.0-46.0% by weight, more particularly preferably 18.0-42.0% by weight, and in particular 20.0-40.0% by weight, relative to the total weight of the mixture.

According to another preferred embodiment, the fraction of rhodium compound (ii) is at least 0.01% by weight, more preferably at least 0.03% by weight, even more preferably at least 0.05% by weight, and particularly preferably at least 0.07% by weight, relative to the total weight of the mixture. According to another preferred embodiment, the fraction of rhodium compound (ii) is no more than 3.00% by weight, more preferably no more than 2.00% by weight, even more preferably no more than 1.00% by weight, and particularly preferably no more than 0.50% by weight, relative to the total weight of the mixture. According to yet another preferred embodiment, the fraction of rhodium compound (ii) is 0.01-3.00% by weight, more preferably 0.03-2.00% by weight, even more preferably 0.05-1.00% by weight, and particularly preferably 0.10-0.50% by weight, relative to the total weight of the mixture.

According to another preferred embodiment, the fraction of solvent (iii) is at least 40.0% by weight, more preferably at least 45.0% by weight, even more preferably at least 50.0% by weight, particularly preferably at least 55.0% by weight, and more particularly preferably at least 60.0% by weight, relative to the total weight of the mixture. According to another preferred embodiment, the fraction of solvent (iii) is no more than 90.0% by weight, more preferably no more than 85.0% by weight, even more preferably no more than 80.0% by weight, particularly preferably no more than 75.0% by weight, and more particularly preferably no more than 70.0% by weight, relative to the total weight of the mixture. According to another preferred embodiment, the fraction of solvent (iii) is 40.0-90.0% by weight, more preferably 45.0-85.0% by weight, even more preferably 50.0-80.0% by weight, particularly preferably 55.0-75.0% by weight, and more particularly preferably 60.0-70.0% by weight, relative to the total weight of the mixture.

According to another embodiment, the fraction of silver thiolate (iv), if any is present, is at least 0.1% by weight, more preferably at least 0.2% by weight, even more preferably at least 0.3% by weight, particularly preferably at least 0.5% by weight, and more particularly preferably at least 0.7% by weight, relative to the total weight of the mixture. According to another preferred embodiment, the fraction of silver thiolate (iv) is no more than 20.0% by weight, more preferably no more than 10.0% by weight, even more preferably no more than 7.0% by weight, particularly preferably no more than 5.0% by weight, and more particularly preferably no more than 2.0% by weight, relative to the total weight of the mixture. According to a further preferred embodiment, the fraction of silver thiolate (iv) is 0.1-20.0% by weight, more preferably 0.2-10.0% by weight, even more preferably 0.3-7.0% by weight, particularly preferably 0.5-5.0% by weight, and more particularly preferably 0.7-2.0% by weight, relative to the total weight of the mixture.

According to another embodiment, the fraction of palladium compound and/or platinum compound (v), if any is present, is at least 0.1% by weight, more preferably at least 0.2% by weight, even more preferably at least 0.3% by weight, particularly preferably at least 0.5% by weight, and more particularly preferably at least 0.7% by weight, relative to the total weight of the mixture. According to another preferred embodiment, the fraction of palladium compound and/or platinum compound (v) is no more than 30.0% by weight, more preferably no more than 20.0% by weight, even more preferably no more than 10.0% by weight, particularly preferably no more than 5.0% by weight, and more particularly preferably no more than 2.0% by weight, relative to the total weight of the mixture. According to another preferred embodiment, the fraction of palladium compound and/or platinum compound (v) is 0.1-30.0% by weight, more preferably 0.2-20.0% by weight, even more preferably 0.3-10.0% by weight, particularly preferably 0.5-5.0% by weight, and more particularly preferably 0.7-2.0% by weight, relative to the total weight of the mixture.

According to yet another embodiment, the fraction of solvents other than solvent (iii), in particular ingredients that are liquid at a temperature of 25° C. and a pressure of 1.013 bar and are different from solvents (iii), is no more than 20.0% by weight, preferably no more than 15.0% by weight, even more preferably no more than 10.0% by weight, particularly preferably no more than 5.0% by weight, and more particularly preferably no more than 3.0% by weight, relative to the total weight of the mixture.

According to a particularly preferred embodiment, the mixture contains (i) a gold thiolate, (ii) a rhodium(III) compound, and (iii) a solvent that contains at least one OH group, preferably a mono-alcohol, in which the mixture has a ratio $V=(a)/(b) \geq 2.2$, where (a) is the fraction of solvent (iii) and (b) is the gold fraction of the gold thiolate (i), each relative to the total weight of the mixture, and in which the mixture contains at least 5.0% by weight gold and at least 40.0% by weight solvent (iii), each relative to the total weight of the mixture.

According to a particularly preferred embodiment, the mixture contains (i) an aliphatic gold thiolate, (ii) a rhodium(III) compound, and (iii) a mono-alcohol, in which the mixture has a ratio $V=(a)/(b) \geq 2.2$, where (a) is the fraction of solvent (iii) and (b) is the gold fraction of the gold thiolate (i), each relative to the total weight of the mixture.

According to another particularly preferred embodiment, the mixture contains (i) a gold thiolate that contains, in an α position with respect to the thiol group of the thiolate residue, a tertiary carbon atom that is connected to three aliphatic or heteroaliphatic residues, (ii) a rhodium(III) compound and (iii) 1-heptanol, in which the mixture has a ratio V=(a)/(b)≥2.2, where (a) is the fraction of 1-heptanol and (b) is the gold fraction of the gold thiolate (i), each relative to the total weight of the mixture.

According to another particularly preferred embodiment, the mixture contains (i) a gold thiolate that contains, in an α position with respect to the thiol group of the thiolate residue, a tertiary carbon atom that is connected to three aliphatic or heteroaliphatic residues, (ii) a rhodium(III) compound, and (iii) 1-heptanol, in which the mixture has a ratio V=(a)/(b)≥2.2, where (a) is the fraction of 1-heptanol and (b) is the gold fraction of the gold thiolate (i), each relative to the total weight of the mixture, and in which the mixture contains at least 5.0% by weight gold, relative to the total weight of the mixture.

According to another particularly preferred embodiment, the mixture contains (i) a gold thiolate that contains, in an α position with respect to the thiol group of the thiolate residue, a tertiary carbon atom that is connected to three aliphatic or heteroaliphatic residues, (ii) a rhodium(III) compound, and (iii) 1-heptanol, in which the mixture has a ratio V=(a)/(b)≥2.2, where (a) is the fraction of 1-heptanol and (b) is the gold fraction of the gold thiolate (i), each relative to the total weight of the mixture, and wherein the mixture contains at least 5.0% by weight gold and at least 40.0% by weight 1-heptanol, each relative to the total weight of the mixture.

Another subject matter of the present invention relates to a method for producing a layered structure, comprising the steps of:

(a) providing a mixture containing
 (i) a gold thiolate,
 (ii) a rhodium(III) compound, and
 (iii) a solvent that contains at least one OH group,
 wherein the mixture has a ratio V=(a)/(b)≥2.2, where (a) is the fraction of solvent
 (iii) and (b) is the gold fraction of the gold thiolate (i), each relative to the total weight of the mixture,
(b) applying the mixture through a nozzle onto a substrate to obtain a precursor (12), and
(c) heating the precursor to a temperature above 200° C. to obtains the layered structure.

The step of providing the mixture in step (a) may be effected in any manner a person skilled in the art would select to provide the mixture for a method of this type. Preferably, the mixture is provided in a container that is suitable for the application of the mixture in step (b). Also preferably, the container is a container that has a valve for dosed dispensation of the mixture. Preferably, the container is a printer cartridge.

The application of the mixture through a nozzle onto the substrate while obtaining the precursor may be effected in any manner a person skilled in the art would select for applying the mixture in a method of this type. In this context, it is preferred to superimpose the mixture on the substrate, which is also referred to as the substrate layer hereinafter.

Preferably, the application is a deposition of the mixture onto the substrate. The deposition of the mixture may be effected, for example, by spin-coating, casting, dripping it on, sputtering, spraying, with a squeegee or by printing, for example by a dosing pump or a jet of ink (Inkjet) or by screen printing onto the substrate layer. Preferably, the mixture is applied onto the substrate surface by a dosing pump, inkjet printing or screen printing. Preferably, a layer of the mixture with a wet film thickness of 0.5 μm to 250 μm, preferably with a wet film thickness of 2 μm to 150 μm, is thus applied.

In the scope of the invention, depositing may be understood to mean that the mixture used for application, preferably also referred to as liquid or printing mass, is applied onto the surface to be superimposed by an aid in the form of a nozzle. This may be done with different aids. Accordingly, the printing mass used for application or superimposition onto the substrate layer may be sprayed, spattered or deposited through a slitted nozzle onto the substrate layer. Other methods of note include curtain coating and spin coating. In addition, the printing mass used for application or superimposition may be applied and/or printed onto the surface of the substrate, for example, by a roll or roller. Micro-dosing or digital printing through a nozzle, for example, are known as spraying and/or spattering methods. In this context, a pressure may be exerted on the printing mass used for application of superimposition or the printing mass used for application is simply dripped onto the surface through a nozzle. In a preferred embodiment of the method, the nozzle has an opening of a size in the range of 10 to 70 μm.

It is preferred to use a screen printing method as a further printing method. In the screen printing method, a screen consisting of a shape-stable material, such as wood, metal, preferably steel, a ceramic material or a plastic material with a selected mesh size, is arranged on or over the object to be superimposed, such as the substrate in the present case. The printing mass used for application or superimposition is applied to the screen and is pressed through the meshes using a squeegee. As the screen has a pattern, different amounts of the printing mass used for application or superimposition may be applied to different sites in the screen. Accordingly, the geometry and arrangement of the meshes may be used to apply either a uniform film of the printing mass used for superimposition or alternating regions bearing no or little printing mass used for application and regions bearing much printing mass used for application. Preferably, a uniform film of the printing mass used for superimposition is transferred to the surface. The screen meshes may just as well be partially closed by corresponding applied materials (copying layers, screen printing templates) such that the printing mass is transferred onto the substrate only in defined regions with open meshes, e.g., in order to obtain a defined structure, such as a pattern, in this way. Moreover, instead of screens, thin films with defined openings (stencil) may be used just as well for superimposing the printing mass.

Depending on the design of the nozzle as well as the viscosity and polarity of the printing mass used for superimposition, layers differing in thickness may be applied to the desired surface of the substrate layer. Preferably, the layer applied during the application or superimposition has a thickness in the range of 0.5 to 100 μm, preferably in the range of 1 to 50 μm, particularly preferably in the range of 2 to 30 μm. The thickness of the layer applied during application may be referred to as wet layer thickness hereinafter. The wet layer thickness depends on the material that is applied during the superimposition as well as the application technique used. The wet layer thickness is measured right after the step of superimposition.

The substrate may be of any shape that allows the mixture to be applied to the substrate. Preferably, the substrate has at least one contiguous surface which has a surface area in the range of 1 mm² to 10 m² or preferably in the range of 10 mm² to 5 m² or preferably in the range of 100 mm² to 1 m². The substrate may be round, circular, angular, cone-shaped or oval. Preferably, the shape of the substrate is a sphere, a cone, a circl,; a polygon such as a triangle, a square, a rectangle, a trapezoid, a pentagon, a hexagon, a heptagon or an octagon, an oval or a combination of at least two thereof. Preferably, the mixture superimposes a region of 10 to 100% or preferably a region of 20 to 100% or preferably a region of 50 to 100% of the substrate, relative to the total contiguous surface of the substrate, in step (b). The mixture may be applied uniformly or in patterns onto the surface of the substrate. Accordingly, regions superimposed by the mixture and non-superimposed regions may alternate. The pattern may have a regular shape, such as a chessboard-like, honeycomb-shaped or diamond-shaped pattern. Alternatively or additionally, the mixture may be applied in an irregular shape onto the substrate.

After the application of the mixture in step (b) to obtain the precursor, step (c) involves heating the precursor to a temperature above 200° C., preferably above 400° C. or preferably above 600° C. The heating may proceed in any manner a person skilled in the art would select for this purpose. The heating is preferably selected from the group consisting of irradiation, heating in a furnace, heating by hot gas or a combination of at least two thereof. The irradiation may proceed, for example, by IR radiation, laser radiation, UV radiation or a combination thereof. The heating in a furnace may proceed, for example, discontinuously or continuously. The heating by a hot gas may proceed, for example, by supplying a hot flow of a gas such as air, nitrogen, oxygen or a mixture thereof. The heating in step (c) preferably proceeds for a period of time in the range of 0.5 to 40 h or preferably in the range of 1 to 30 h or preferably in the range of 2 to 20 h. The heating results in a layered structure containing at least the substrate and a gold-containing layer.

In a preferred refinement of the method, the viscosity of the mixture is less than 40 mPas, preferably less than 30 mPas or preferably less than 20 mPas. The viscosity is determined at a shear rate of 1/200 s.

In a preferred refinement of the method, the heating of the precursor in step (c) proceeds at a temperature in the range of 250 to 1,100° C. Temperatures in the range of 800 to more than 1,000° C. are used, in particular, for producing ceramic materials with ingredients that are difficult to melt, such as zirconium oxide.

In a preferred refinement of the method, the heating of the precursor in step (c) proceeds at a temperature in the range of 500 to 1,000° C. It is preferred to select this temperature range if the substrate is a ceramic material, for example for producing a tile. If the layered structure to be produced is, for example, a tile, the precursor is heated to a temperature of 800° C. in step (c).

In a preferred refinement of the method, the heating of the precursor in step (c) proceeds at a temperature in the range of 470 to 900° C. It is preferred to select this temperature range if the substrate is a glass.

In a preferred refinement of the method, the substrate has a conductivity of less than $10^{13}$ S/cm. Preferably, the substrate has an electrical conductivity in the range of $10^3$ S/cm to $10^{-13}$ S/cm or in the range of $10^2$ S/cm to $10^{-10}$ S/cm or in the range of $10^1$ S/cm to $10^{-8}$ S/cm.

The substrate, onto which the mixture is applied as described above, may be any material a person skilled in the art would use to produce a layered structure.

In a preferred refinement of the method, the substrate is selected from the group consisting of a glass, a stone, a concrete, a ceramic, such as earthenware, crockery, stoneware or porcelain, or a combination of at least two thereof. The glass may be any glass a person skilled in the art would select for the substrate in a layered structure and is preferably selected from an alkali glass, a non-alkali glass, a silicate glass or a mixture of at least two thereof. Preferably, the glass is selected from a soda-lime glass, a lead alkaline glass, borosilicate glass, aluminium-silicate glass, quartz glass or a mixture of at least two thereof.

The stone may be any natural or artificial stone a person skilled in the art would select for the substrate in a layered structure. Natural stones may be all types of stone that are of geological origin, for example tuff, sandstone, basalt, gypsum, granite, marble, shale, precious stones, semi-precious stones, such as alabaster or quartzes, or at least two thereof. An artificial stone may be any stone that is of non-geological origin in any known manner. Examples of artificial stones include bricks, clinker, sand-lime bricks or at least two thereof.

The concrete may be any concrete mixture a person skilled in the art would select for the substrate in a layered structure. Preferably, the concrete is a mixture of an aggregate and a binding agent. Preferably, the aggregate is grit or sand or a mixture thereof. The binding agent is usually cement. Preferably, the concrete is selected from the group consisting of reinforced concrete, pre-stressed concrete or fiber concrete or a combination of at least two thereof.

The ceramic material may be any ceramic material a person skilled in the art would select for the substrate in a layered structure and is preferably selected from an oxide ceramic, a silicate ceramic, a non-oxide ceramic or a mixture of at least two thereof.

The oxide ceramic is preferably selected from a metal oxide, a metalloid oxide or a mixture thereof. The metal of the metal oxide may be selected from aluminium, beryllium, barium, calcium, magnesium, sodium, potassium, iron, zirconium, titanium, zinc, tin or a mixture of at least two thereof. The metal oxide is preferably selected from aluminium oxide ($Al_2O_3$), calcium oxide, sodium oxide, potassium oxide, magnesium oxide (MgO), silicon oxide ($SiO_2$), zirconium oxide ($ZrO_2$), yttrium oxide ($Y_2O_3$), aluminium-titanate ($Al_2TiO_5$) or a mixture of at least two thereof. The metalloid of the metalloid oxide is preferably selected from the group consisting of boron, silicon, arsenic, tellurium, lead, bismuth or a mixture of at least two thereof The silicate ceramic is preferably selected from a steatite ($Mg_3[Si_4O_{10}(OH)_2]$), cordierite $(Mg,Fe^{2+})_2(Al_2Si)^{[4]}[Al_2Si_4O_{18}])$, mullite ($Al_2Al_{2+2x}Si_{2-2x}O_{10-x}$ where x=oxygen voids per elemental cell), feldspar (Ba,Ca,Na,K,$NH_4$)(Al,B,$SO_4O_8$) or a mixture of at least two thereof. The silicate ceramic is preferably a porcelain.

The non-oxide ceramic may be selected from a carbide, a nitride or a mixture thereof. The carbide may be selected from the group consisting of silicon carbide (SiC), boron carbide ($B_4C$), titanium carbide (TiC), tungsten carbide, cementite ($Fe_3C$) or a mixture of at least two thereof. The nitride may be selected from silicon nitride ($Si_3N_4$), aluminium nitride (AlN), silicon-aluminium-oxinitride (SIALON) or a mixture of at least two thereof.

A further subject matter of the present invention is a precursor of a layered structure, obtained according to process steps (a) and (b) of the method described above.

In a preferred refinement of the precursor, the precursor has at least one of the following properties:
(E1) the thickness of the substrate is in the range of 0.1 mm to 5 cm;

(E2) the thickness of the mixture applied in step (b) is in the range of 0.01 μm to 5 μm;
(E3) the conductivity of the substrate is less than $10^{13}$ S/cm;
(E4) the conductivity of the mixture applied in step (b) is in the range of $10^{-2}$ S/cm to $10^{-8}$ S/cm.

Another subject matter of the present invention is a layered structure that may be obtained according to the method described above.

In a preferred refinement of the layered structure, the layered structure has at least one of the following properties:
(e1) The layered structure contains a metal layer that comprises at least 70% by weight gold and has a thickness in the range of 0.05 μm to 1 mm;
(e2) the thickness is in the range of 0.1 mm to 5 cm;
(e3) the conductivity is above 1013 S/cm;
(e4) the gloss is in the range of 800 to 1,500 gloss units (GU), preferably in the range of 500 to 1,300 GU;
(e5) the density is in the range of 1.1 to 1.3 kg/L;

Another subject matter of the present invention is an object containing a layered structure as described above or a layered structure that may be obtained according to the method described above. The object may be any object a person skilled in the art would select for this purpose such as a glass pane, a tile, a stone plate, a metal plate, a wooden plate, a plastic plate or film, a vase, a dish, a cup, a beaker or a combination of at least two thereof.

where (a) is the fraction of 1-heptanol and (b) is the gold fraction of the gold thiolate, each relative to the total weight of the mixture. In Table 2, the numbers given refer to the mass of the individual ingredients in units of gram. V=(a)/(b)≥2.2, where (a) is the fraction of solvent listed, and (b) is the gold fraction of the gold thiolate, each relative to the total weight of the mixture.

TABLE 1

Composition of the Mixtures according to Examples 1-4 and Reference example 1.

| | Example | | | | Reference example |
|---|---|---|---|---|---|
| | 1 | 2 | 3 | 4 | 1 |
| Gold(I) tert-dodecylmercaptan [gold fraction] | 31.25 [15.00] | 31.25 [15.00] | 31.25 [15.00] | 31.25 [15.00] | — |
| Gold(I) pinanylmercaptan [gold fraction] | — | — | — | — | 19.91 [10.00] |
| 1-Heptanol | 64.95 | 37.50 | 34.50 | 31.50 | 67.00 |
| Rhodium triisononylcarboxylate solution | 1.75 | 1.75 | 1.75 | 1.75 | 1.75 |
| Additive mixture | 2.05 | 2.05 | 2.05 | 2.05 | 2.05 |
| Toluene | — | 27.45 | 30.45 | 33.45 | 9.29 |
| V | 4.33 | 2.50 | 2.30 | 2.10 | 6.70 |

TABLE 2

Composition of the Mixtures according to Examples 5-9 and Reference Examples 2-5

| | Example | | | | | Reference example | | | |
|---|---|---|---|---|---|---|---|---|---|
| | 5 | 6 | 7 | 8 | 9 | 2 | 3 | 4 | 5 |
| Gold(I) tert-dodecylmercaptan [gold fraction] | 20.83 [10.00] | 20.83 [10.00] | 20.83 [10.00] | 20.83 [10.00] | 31.25 [15.00] | 20.83 [10.00] | 20.83 [10.00] | 20.83 [10.00] | 20.83 [10.00] |
| Silver(I) tert-dodecylmercaptan [gold fraction] | — | — | — | — | 3.00 [1.00] | — | — | — | — |
| 1-Heptanol | 78.00 | — | — | — | 62.12 | — | — | — | — |
| 1-Hexanol | — | 78.00 | — | — | — | — | — | — | — |
| 1-Butanol | — | — | 78.00 | — | — | — | — | — | — |
| 2-Butanol | — | — | — | 78.00 | — | — | — | — | — |
| 1-Octane | — | — | — | — | — | 78.00 | — | — | — |
| Cyclohexane | — | — | — | — | — | — | 78.00 | — | — |
| Methyl-isobutylketone | — | — | — | — | — | — | — | 78.00 | — |
| Diethylene glycol diethylether | — | — | — | — | — | — | — | — | 78.00 |
| Rhodium triisononylcarboxylate solution | 0.50 | 0.50 | 0.50 | 0.50 | 1.75 | 0.50 | 0.50 | 0.50 | 0.50 |
| Additive mixture | 0.67 | 0.67 | 0.67 | 0.67 | 1.88 | 0.67 | 0.67 | 0.67 | 0.67 |
| V | 7.80 | 7.80 | 7.80 | 7.80 | 7.80 | 7.80 | 7.80 | 7.80 | 7.80 |

The invention is illustrated in more detail in the following based on non-limiting examples and exemplary figures.

EXAMPLES

Various mixtures having the compositions shown in Tables 1 and 2, were produced and printed onto substrates. In Table 1, the numbers given refer to the mass of the individual ingredients in units of gram. V=(a)/(b)≥2.2, Production of gold(I) tert-dodecylmercaptan:
240.0 g deionized water, 240.0 g ice (made from deionized water), and 73.07 g DL-methionine were weighed and placed in a 2 L-beaker and mixed by stirring. A dropping funnel was used to add 128.0 g gold(I) chloride solution (gold content=37.5% by weight) to this mixture at a temperature of 0 to 10° C. while stirring. A clear, colorless solution was thus produced. After the addition was completed, a mixture of 47.48 g tert-dodecylmercaptan and 112 g methylene chloride was added rapidly to this solution while stirring. The stirring was continued for another 30 minutes to complete the reaction. Two phases were produced, namely an upper almost colorless aqueous phase and a lower yellowish organic phase. The two phases were separated from each other. The organic phase was washed three times with 240 g deionized water each. Then, the organic phase was slowly added into 630 g methanol while stirring. The stirring was continued for another 45 minutes after the addition was completed. This produced a coarse-grained yellowish precipitate. The precipitate was allowed to sediment completely. Subsequently, the precipitate was washed twice with 350 g methanol each, passed through a suction filter, and dried in air for several days.

Production of the Mixtures of Examples 1-4 and Reference Example 1:

31.25 g gold(I) tert-dodecylmercaptan (corresponds to a gold amount of 15.00 g; Examples 1-3 and Reference Example 1) or 19.91 g gold(I) pinanylmercaptan (corresponding to a gold amount of 10.00 g; Example 4) and the amounts of 1-heptanol specified in Table 1 were weighed and placed in a 250 mL beaker and dissolved by stirring at room temperature. A total of 1.75 g of a solution of rhodium triisononylcarboxylate in 1-heptanol (containing 28% by weight rhodium(III) triisononylcarboxylate and 72% by weight 1-heptanol) and 2.05 g of an additive mixture were added to this solution and the sample was stirred. The additive mixture was a common additive mixture for the technical field that contained 175 parts by weight of a solution of bismuth ethylhexanoate (containing 80-90% by weight bismuth ethylhexanoate, 10-15% by weight Shellsol A and <5% by weight ethylhexanoic acid, bismuth content=20% by weight relative to the weight of the bismuth ethylhexanoate solution; Wilhelm Priem GmbH & Co. KG, Bielefeld, Germany) and 30 parts by weight BYK-306 (polyether-modified polydimethylsiloxane, Byk-Gardner GmbH, Geretsried, Germany). If necessary, the mixture was topped up to 100.00 g with toluene. Subsequently, the mixture was filtered through a 1.4 μm filter.

Production of the Mixtures According to Examples 5-9 and Reference Examples 2-5:

To produce the mixtures according to Examples 5-9 and Reference Examples 2-5, 20.83 g gold(I) tert-dodecylmercaptan (corresponding to a gold amount of 10.00 g) or, for Example 9, 31.25 g gold(I) tert-dodecylmercaptan (corresponding to a gold amount of 15.00 g) and 3.00 g silver(I) tert-dodecylmercaptan (corresponding to a silver amount of 1.00 g) and the solvents according to Table 2 in the amounts specified therein were weighed and placed in a 250 mL beaker and dissolved by stirring at room temperature. The specified quantity of a solution of rhodium triisononylcarboxylate in 1-heptanol (containing 28% by weight rhodium (III) triisononylcarboxylate and 72% by weight 1-heptanol) was added to this solution, the solution was topped up to 100.00 g with an additive mixture, and the sample was stirred. The additive mixture was a common additive mixture for the technical field that contained 175 parts by weight of a solution of bismuth ethylhexanoate (containing 80-90% by weight bismuth ethylhexanoate, 10-15% by weight Shellsol A and <5% by weight ethylhexanoic acid, bismuth content=20% by weight relative to the weight of the bismuth ethylhexanoate solution; Wilhelm Priem GmbH & Co. KG, Bielefeld, Germany) and 30 parts by weight BYK-306 (polyether-modified polydimethylsiloxane, Byk-Gardner GmbH, Geretsried, Germany). Subsequently, the mixture was filtered through a 1.4 μm filter.

Printing a Mixture onto a Substrate, and Production of a Layered Structure:

The mixtures according to Tables 1 and 2 were printed onto substrates by inkjet printers, and subsequently subjected to firing.

Glazed tiles (Boizenburg Fliesen GmbH) 0.5 cm in thickness and with external dimensions of 15×20 cm were used as substrates. The glazed tiles have a smooth, glossy, and dense surface. The digital printing was performed at a temperature of 45° C. and a base voltage of 18.0 V and an offset of 4.5 V using an INK-Jet Tester 70/1 made by Projecta Engineering S.p.A. The print head was a Xaar 1001, which is commercially available from Xaar Plc.

The layer printed onto the tiles was fired by treating the samples in a furnace made by Nabertherm GmbH, type LH 60/13, at a maximal temperature of 780° C. for a heating time of 45 minutes and a dwell time of 10 minutes, and then the samples were cooled to room temperature in the switched-off furnace for 4 hours after the end of the dwell time.

Evaluation of the Mixtures:

The mixtures from the Examples and Reference Examples were analyzed and evaluated with respect to the corrosion resistance during printing with an inkjet printer, the stability, and the printability with an inkjet printer. The results are shown in Table 3. The following ratings were used:

with regard to the corrosion resistance during printing with an inkjet printer: "+++" No visible deposition of gold on metal parts of the inkjet printer during printing; "---" unacceptable amounts of gold deposited on the metal parts of the inkjet printer;

with regard to stability: "+++" No segregation during storage for 7 days at 25° C.; "---": obvious segregation during storage for 7 days at 25° C. rendering the mixture unsuitable for inkjet printing;

with regard to printability with an inkjet printer: "+++" The mixture was printed with the inkjet printer without problems; "---": The mixture could not be printed with an inkjet printer.

TABLE 3

Corrosion resistance upon printing with an inkjet printer, stability, and printability with an inkjet printer of the mixtures according to the Examples and Reference Examples.

| Example | Corrosion resistance | Stability | Printability |
|---|---|---|---|
| Example 1 | +++ | +++ | +++ |
| Example 2 | +++ | +++ | +++ |
| Example 3 | ++ | +++ | +++ |
| Example 4 | +++ | +++ | +++ |
| Example 5 | +++ | +++ | +++ |
| Example 6 | + | ++ | +++ |
| Example 7 | + | + | +++ |
| Example 8 | ++ | + | +++ |
| Example 9 | +++ | +++ | +++ |
| Reference example 1 | − | +++ | +++ |
| Reference example 2 | --- | − | -- |
| Reference example 3 | ++ | +++ | -- |
| Reference example 4 | ++ | +++ | − |
| Reference example 5 | ++ | ++ | − |

Figure 1:
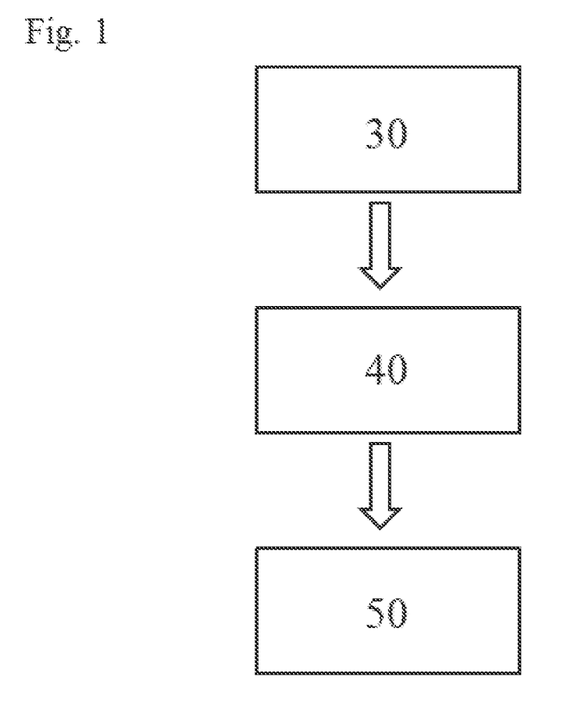
FIG. 1 is a flow chart of the process steps in a method according to an embodiment of the invention.

FIG. 1 is a flow chart of the steps of the method according to an embodiment of the invention. In step (a) 30, the mixture 6 from Example 1 is provided in a container. In step (b) 40, the composition 6 is applied onto a substrate 4, for example in the form of a tile 20×15 cm in size, by digital printing using a nozzle of an inkjet printer. The wet film thickness of the mixture 6 is 10-20 μm. The substrate 4 and the mixture 6 jointly form the precursor 12 according to the invention. The substrate 4 and the mixture 6 are jointly fired in step (c) 50 in a commercial furnace made by Nabertherm, Typ LH60/13 at 750° C. As a result, a gold layer, yellow layer or white gold layer 8 is formed from the mixture 6 and a layered structure 2 according to the invention is thus obtained.

Figure 2A:
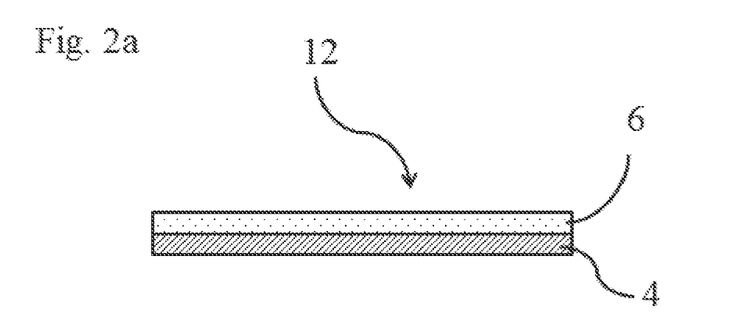
FIG. 2a is a schematic view of a precursor according to another embodiment of the invention.

FIG. 2a shows a precursor 12 that consists of a substrate 4 onto which a mixture 6 has been applied. The substrate 4 may, for example, be a glass or a ceramics.

Figure 2B:
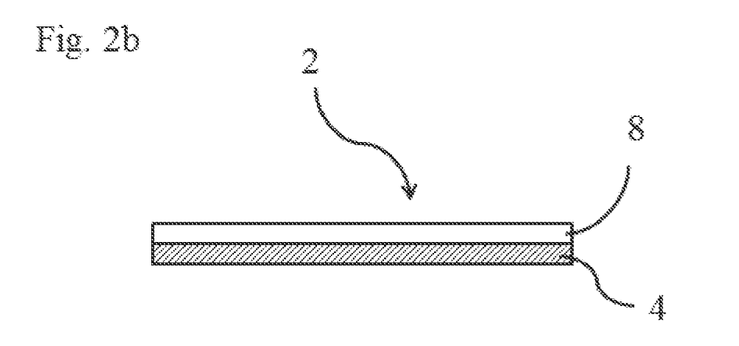
FIG. 2b is a schematic view of a layered structure according to a further embodiment of the invention.

FIG. 2b shows a layered structure 12 that consists of a substrate 4 on which a metal layer 8, preferably a gold layer, yellow layer or white gold layer, has been formed.

Figure 2C:
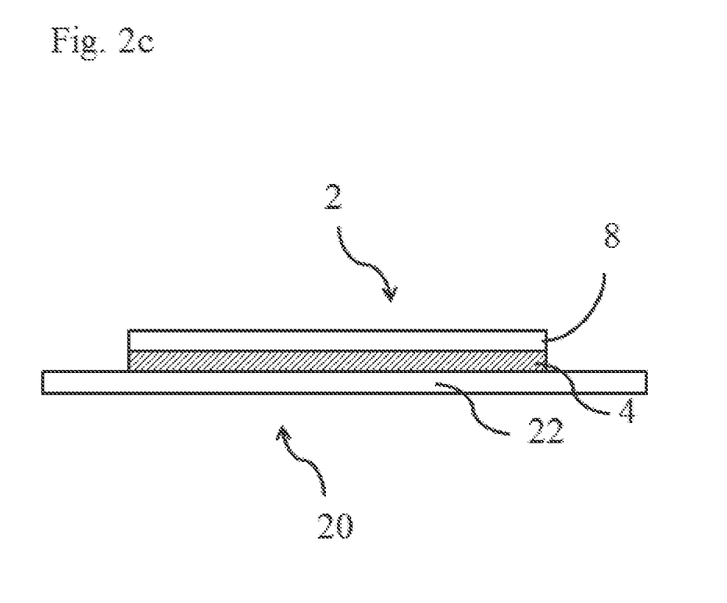
FIG. 2c is a schematic view of an object having a layered structure according to another embodiment of the invention.

FIG. 2c shows an object 20 consisting of a layer 22 onto which a layered structure 2 has been applied. The layer structure 2 includes the substrate 4 as well as the gold layer, yellow layer or white gold layer. The layered structure 2 may have the same dimensions and materials as described with respect to FIGS. 2a and 2b.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A mixture comprising:
   (i) a gold thiolate,
   (ii) a rhodium(III) compound, and
   (iii) a solvent containing at least 4 carbon atoms and at least one OH group and having a molar mass of 60-150 g/mol, wherein the mixture has a ratio V =(a) / (b) ≥2.2, where (a) is a fraction of solvent (iii) and (b) is a gold fraction of the gold thiolate (i), each relative to the total weight of the mixture.

2. The mixture according to claim 1, wherein the mixture contains at least 5.0% by weight gold.

3. The mixture according to claim 1, wherein the gold thiolate is selected from the group consisting of aliphatic gold thiolates, heteroaliphatic gold thiolates, and aromatic gold thiolates.

4. The mixture according to claim 3, wherein the gold thiolate contains at least five carbon atoms.

5. The mixture according to claim 4, wherein the carbon atom in an α position with respect to the thiol group of the thiolate residue in the gold thiolate is a secondary or tertiary carbon atom.

6. The mixture according to claim 5, wherein the tertiary carbon atom is connected to three aliphatic or heteroaliphatic residues, wherein one of the aliphatic or heteroaliphatic residues contains at least four carbon atoms and two of the aliphatic or heteroaliphatic residues contain no more than three carbon atoms.

7. The mixture according to claim 6, wherein the gold thiolate is represented by the formula Au(I)—$R^1$, wherein $R^1$ represents a —S—$C(CH_3)_2$—$C_9H_{19}$ residue.

8. The mixture according to claim 1, wherein the rhodium (III) compound is represented by the formula Rh(III)—$R^2R^3R^4$, wherein $R^2$, $R^3$, and $R^4$ are each independently aliphatic or heteroaliphatic residues.

9. The mixture according to claim 8, wherein at least one of the residues $R^2$, $R^3$, and $R^4$ is a carboxylate residue.

10. The mixture according to claim 1, wherein the rhodium(III) compound contains at least seven carbon atoms.

11. The mixture according to claim 10, wherein the rhodium(III) compound is rhodium triisononylcarboxylate.

12. The mixture according to claim 1, wherein the solvent is a hydroxyaliphatic solvent.

13. The mixture according to claim 1, wherein the solvent is an acyclic solvent.

14. The mixture according to claim 1, wherein the solvent is an alcohol.

15. The mixture according to claim 14, wherein the alcohol is a mono-alcohol.

16. The mixture according to claim 1, wherein the solvent is selected from the group consisting of 1-butanol, 2-butanol, 1-pentanol, 2-pentanol, 3-pentanol, 1-hexanol, 2-hexanol, 3-hexanol, 1-heptanol, 2-heptanol, 3-heptanol, 4-heptanol, 1-octanol, 2-octanol, 3-octanol, and 4-octanol.

17. The mixture according to claim 1, wherein the solvent is 1-heptanol.

18. The mixture according to claim 1, wherein the ratio V is in the range of 2.3-18.

19. The mixture according to claim 1, further comprising (iv) a silver thiolate.

20. The mixture according to claim 1, further comprising (v) a palladium or platinum compound selected from the group consisting of palladium thiolates, palladium carboxylates, platinum thiolates, and platinum carboxylates.

21. The mixture according to claim 1, wherein a maximum fraction of halide compound is 0.1% by weight, relative to the total weight of the mixture.

22. The mixture according to claim 1, wherein a maximum fraction of fatty acids is 5.0% by weight, relative to the total weight of the mixture.

23. A method for providing a layered structure comprising the steps of:
    (a) providing a mixture containing:
       (i) a gold thiolate,
       (ii) a rhodium(III) compound, and
       (iii) a solvent containing at least one OH group,
    wherein the mixture has a ratio V =(a) / (b)≥2.2, where (a) is a fraction of solvent (iii) and (b) is a gold fraction of the gold thiolate (i), each relative to the total weight of the mixture;
    (b) applying the mixture through a nozzle onto a substrate to obtain a precursor, and
    (c) heating the precursor to a temperature above 200° C. to obtain the layered structure.

24. The mixture according to claim 1, wherein the mixture is appliable using a nozzle.

* * * * *